(12) United States Patent
de Jong et al.

(10) Patent No.: US 11,513,554 B1
(45) Date of Patent: *Nov. 29, 2022

(54) ELECTRONIC DEVICES HAVING DISPLAYS WITH BORDERS OF IMAGE TRANSPORT MATERIAL

(71) Applicant: Apple Inc., Cupertino, CA (US)

(72) Inventors: Erik G. de Jong, San Francisco, CA (US); Jean-Pierre S. Guillou, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,165

(22) Filed: Apr. 21, 2020

Related U.S. Application Data

(60) Provisional application No. 62/891,205, filed on Aug. 23, 2019.

(51) Int. Cl.
*G06F 1/16* (2006.01)
*G02B 5/02* (2006.01)

(52) U.S. Cl.
CPC ......... *G06F 1/1609* (2013.01); *G02B 5/0221* (2013.01); *G06F 1/1652* (2013.01); *G06F 1/1656* (2013.01)

(58) Field of Classification Search
CPC .... G06F 1/1609; G06F 1/1637; G06F 1/1647; G06F 1/1652; G06F 1/1656
See application file for complete search history.

(56) References Cited

U.S. PATENT DOCUMENTS

| 3,853,658 | A | * | 12/1974 | Ney | G02B 6/06 156/290 |
| 4,139,261 | A | * | 2/1979 | Hilsum | G02B 6/08 313/494 |
| 4,349,817 | A | | 9/1982 | Hoffman et al. | |
| 4,534,813 | A | | 8/1985 | Williamson et al. | |
| 4,613,210 | A | * | 9/1986 | Pollard | H04N 3/14 348/E3.016 |
| 4,904,049 | A | * | 2/1990 | Hegg | C03B 37/15 385/116 |
| 5,129,028 | A | * | 7/1992 | Soltan | G02B 6/08 385/115 |

(Continued)

FOREIGN PATENT DOCUMENTS

KR 20180034832 A 4/2018

*Primary Examiner* — Adrian S Wilson
(74) *Attorney, Agent, or Firm* — Treyz Law Group, P.C.; G. Victor Treyz; Tianyi He (57) ABSTRACT

An electronic device may have a housing. A pixel array may be mounted in the housing to display an image. The pixel array may have a central portion surrounded by a peripheral portion. Display cover layer structures may overlap the pixel array. A central portion of the display cover layer structures may overlap the central portion of the pixel array. A peripheral portion of the display cover layer structures may overlap the peripheral portion of the pixel array. A border structure of image transport material may be interposed between the peripheral portion of the pixel array and the peripheral portion of the display cover structures. The image transport material may be omitted from the central portion of the pixel array. The image transport material may be formed from a coherent fiber bundle or Anderson localization material.

20 Claims, 8 Drawing Sheets

(56) References Cited

U.S. PATENT DOCUMENTS

| | | | |
|---|---|---|---|
| 5,329,386 A | | 7/1994 | Birecki et al. |
| 5,465,315 A | * | 11/1995 | Sakai ................ G09F 9/305 |
| | | | 385/116 |
| 5,502,457 A | | 3/1996 | Sakai et al. |
| 5,659,378 A | | 8/1997 | Gessel |
| 6,046,730 A | | 4/2000 | Bowen et al. |
| 6,407,785 B1 | | 6/2002 | Yamazaki |
| 6,467,922 B1 | | 10/2002 | Blanc et al. |
| 6,680,761 B1 | | 1/2004 | Greene et al. |
| 6,845,190 B1 | | 1/2005 | Smithwick et al. |
| 6,892,011 B2 | * | 5/2005 | Walker ............... B29C 48/156 |
| | | | 385/115 |
| 6,892,014 B2 | * | 5/2005 | Cok ........................ G02B 6/06 |
| | | | 345/697 |
| 7,228,051 B2 | * | 6/2007 | Cok ........................ G02B 6/06 |
| | | | 385/146 |
| 7,542,209 B2 | | 6/2009 | McGuire, Jr. |
| 7,773,849 B2 | * | 8/2010 | Shani ................. G02B 6/0046 |
| | | | 385/131 |
| 7,823,309 B2 | | 11/2010 | Albenda |
| 7,856,161 B2 | * | 12/2010 | Tabor ..................... G02B 6/08 |
| | | | 385/120 |
| 8,045,270 B2 | | 10/2011 | Shin et al. |
| 8,411,026 B2 | | 4/2013 | Sampsell |
| 8,666,212 B1 | * | 3/2014 | Amirparviz ....... G02B 27/0172 |
| | | | 385/119 |
| 8,723,824 B2 | | 5/2014 | Myers et al. |
| 8,824,779 B1 | | 9/2014 | Smyth |
| 8,907,863 B2 | * | 12/2014 | Li ........................... H04N 9/12 |
| | | | 345/1.1 |
| 8,976,324 B2 | | 3/2015 | Yang et al. |
| 9,025,111 B2 | | 5/2015 | Teller et al. |
| 9,268,068 B2 | | 2/2016 | Lee |
| 9,312,517 B2 | | 4/2016 | Drzaic et al. |
| 9,342,105 B2 | | 5/2016 | Choi et al. |
| 9,509,939 B2 | | 11/2016 | Henion et al. |
| 9,591,765 B2 | | 3/2017 | Kim et al. |
| 9,755,004 B2 | | 9/2017 | Shieh et al. |
| 9,818,725 B2 | | 11/2017 | Bower et al. |
| 9,907,193 B2 | | 2/2018 | Lee et al. |
| 10,048,532 B2 | | 8/2018 | Powell et al. |
| 10,052,831 B2 | | 8/2018 | Welker et al. |
| 10,185,064 B2 | | 1/2019 | Powell et al. |
| 10,436,979 B2 | | 10/2019 | Yang et al. |
| 10,579,157 B1 | * | 3/2020 | Wilson ................. G06F 3/0216 |
| 10,877,570 B1 | * | 12/2020 | Wilson .................. G06F 3/023 |
| 11,003,015 B1 | * | 5/2021 | Qiao ................... G02F 1/13336 |
| 11,092,835 B2 | * | 8/2021 | Asamizu ............. G02B 6/0068 |
| 2006/0016448 A1 | | 1/2006 | Ho |
| 2007/0052614 A1 | * | 3/2007 | Zimmerman ........... G09F 9/305 |
| | | | 345/1.1 |
| 2007/0097108 A1 | | 5/2007 | Brewer |
| 2008/0144174 A1 | | 6/2008 | Lucente et al. |
| 2008/0186252 A1 | | 8/2008 | Li |
| 2010/0177261 A1 | | 7/2010 | Jin et al. |
| 2010/0238090 A1 | | 9/2010 | Pomerantz et al. |
| 2011/0025594 A1 | | 2/2011 | Watanabe |
| 2011/0057861 A1 | | 3/2011 | Cok et al. |
| 2011/0102300 A1 | | 5/2011 | Wood et al. |
| 2011/0242686 A1 | | 10/2011 | Watanabe |
| 2012/0218219 A1 | | 8/2012 | Rappoport et al. |
| 2013/0081756 A1 | | 4/2013 | Franklin et al. |
| 2013/0083080 A1 | | 4/2013 | Rappoport et al. |
| 2013/0235560 A1 | | 9/2013 | Etienne et al. |
| 2013/0279088 A1 | | 10/2013 | Raff et al. |
| 2014/0037257 A1 | | 2/2014 | Yang et al. |
| 2014/0092028 A1 | | 4/2014 | Prest et al. |
| 2014/0092346 A1 | | 4/2014 | Fang et al. |
| 2014/0183473 A1 | | 7/2014 | Lee et al. |
| 2014/0240985 A1 | | 8/2014 | Kim et al. |
| 2014/0328041 A1 | | 11/2014 | Rothkopf et al. |
| 2014/0354920 A1 | | 12/2014 | Jang et al. |
| 2015/0093087 A1 | | 4/2015 | Wu |
| 2015/0227227 A1 | | 8/2015 | Myers et al. |
| 2016/0231784 A1 | | 8/2016 | Yu et al. |
| 2016/0234362 A1 | | 8/2016 | Moon et al. |
| 2016/0379557 A1 | * | 12/2016 | de Jong ................ G02B 5/3025 |
| | | | 345/697 |
| 2017/0139131 A1 | | 5/2017 | Karafin et al. |
| 2017/0235341 A1 | | 8/2017 | Huitema et al. |
| 2018/0052312 A1 | | 2/2018 | Jia et al. |
| 2018/0088416 A1 | | 3/2018 | Jiang et al. |
| 2018/0113241 A1 | * | 4/2018 | Powell .................. G06F 1/1626 |
| 2018/0128973 A1 | * | 5/2018 | Powell ................ H01L 51/5275 |
| 2018/0143669 A1 | * | 5/2018 | Bok ...................... G06F 3/0446 |
| 2018/0372958 A1 | | 12/2018 | Karafin et al. |
| 2018/0373370 A1 | * | 12/2018 | Jung ................... H04M 1/0283 |

* cited by examiner

ELECTRONIC DEVICES HAVING DISPLAYS WITH BORDERS OF IMAGE TRANSPORT MATERIAL

This application claims the benefit of provisional patent application No. 62/891,205, filed Aug. 23, 2019, which is hereby incorporated by reference herein in its entirety.

FIELD

This relates generally to electronic devices, and, more particularly, to optical structures for electronic devices.

BACKGROUND

Electronic devices may have displays. Displays have arrays of pixels for displaying images for a user. To prevent damage to the pixels, the pixels can be covered with a transparent display cover layer. If care is not taken, however, the inclusion of a display cover layer into an electronic device may cause the device to have larger inactive border regions than desired or may introduce undesired image distortion.

SUMMARY

An electronic device may have a housing. A pixel array may be mounted in the housing to display an image. The pixel array may have a central portion. A peripheral portion of the pixel array may run along the periphery of the central portion.

Display cover layer structures formed from transparent material such as glass, polymer, or crystalline material such as sapphire may overlap the pixel array. A central portion of the display cover layer structures may overlap the central portion of the pixel array. A peripheral portion of the display cover layer structures may overlap the peripheral portion of the pixel array.

The central portion of the display cover layer structures may be formed from first and second layers of material that are attached to each other or an integral display cover layer. The peripheral portion of the display cover layer structures, which may be thinner than the central portion of the display cover layer structures, may overlap a border structure of image transport material. The image transport material may be formed from a coherent fiber bundle or Andersen localization material.

The border structure may be interposed between the peripheral portion of the pixel array and the peripheral portion of the display cover structures. The border structure may have an input surface that receives a peripheral portion of an image from the peripheral portion of the pixel array and an opposing output surface at which this portion of the image is presented.

DETAILED DESCRIPTION

An electronic device may have a display. The display may have an array of pixels for creating an image. The image may pass through a protective display cover layer that overlaps the array of pixels. It may be desirable to expand image size and/or to otherwise optically modify an image presented on the array of pixels, particularly along the one or more peripheral edges of the array of pixels. This can be accomplished by incorporating display border structures formed from image transport material into the electronic device.

For example, to minimize display borders, one or more borders of a pixel array may be provided with a strip of image transport material. The image transport material, which may sometimes be referred to as image transport layer material, may be formed from Anderson localization material or a coherent fiber bundle. The image transport material may receive an image from a display at an input surface and may provide the image to a corresponding output surface for viewing by a user.

In some configurations, the image transport material forming a display border structure may have a shape that helps expand the effective size of the image on a display without imparting undesired distortion to the image. A transparent protective display cover layer may overlap and protect display structures. Edge portions of the display cover layer may overlap the strip of image transport material.

Figure 1:
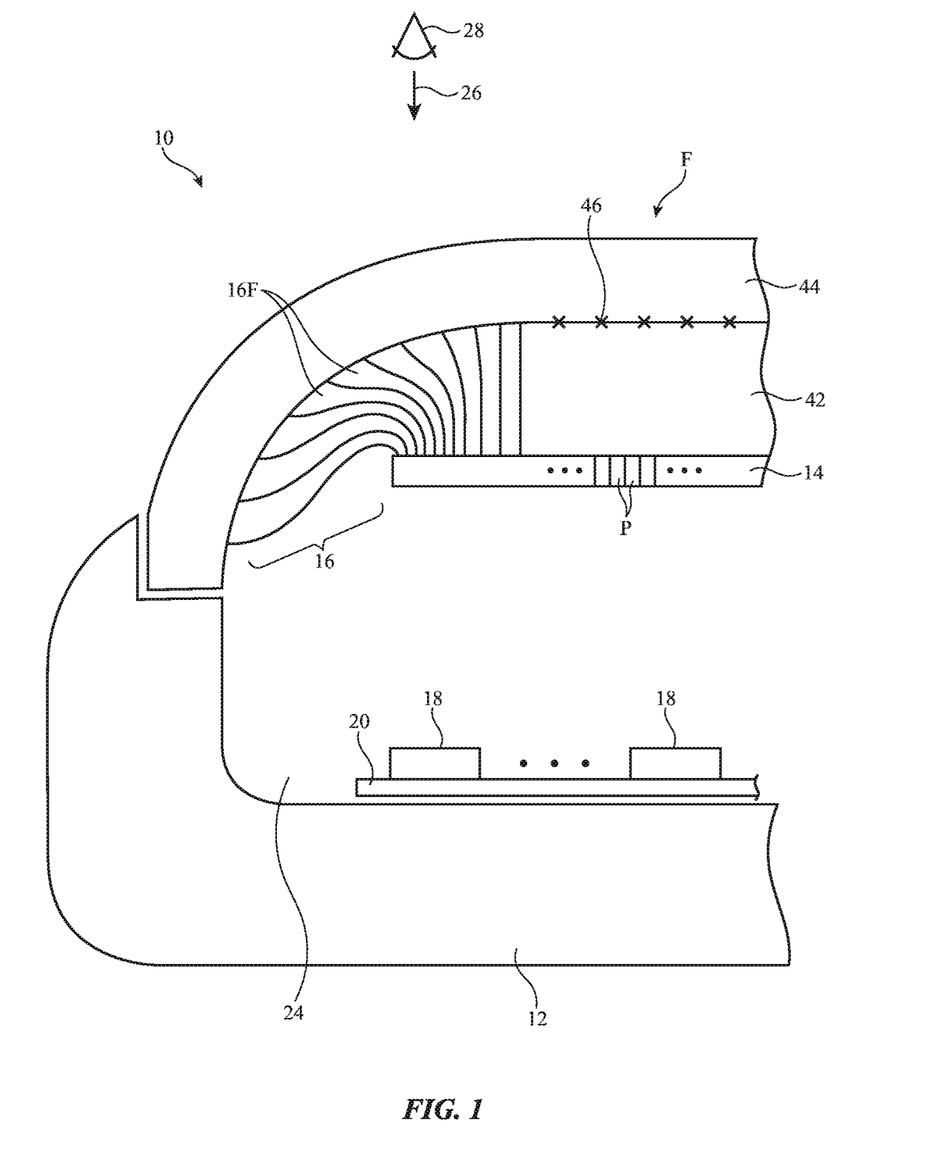
FIG. 1 is a side view of an illustrative electronic device with image transfer layer material overlapping the periphery of a display in accordance with an embodiment.

A cross-sectional side view of a portion of an illustrative electronic device with a display cover layer and a border structure of image transport material is shown in FIG. 1. In the example of FIG. 1, device 10 is a portable device such as a cellular telephone, wristwatch, or tablet computer. Other types of devices may have display cover layers with image transport material, if desired.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from the exterior region surrounding device 10.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may be sufficiently flexible to be bent. Displays for device 10 may have pixel arrays for displaying images for a user. Each pixel array may be mounted under a transparent display cover layer that helps to protect the pixel array. In the example of FIG. 1, display 14 (which may sometimes be referred to as a pixel array, display panel, display layer, or display substrate) has an array of pixels P and is mounted under display cover layer 44.

The display cover structures overlapping display 14, which may sometimes be referred to as transparent housing structures, may be coupled to opaque housing structures and/or transparent housing structures (see, e.g., the walls of housing 12 of FIG. 1). These display cover structures may include structures formed from one or more transparent materials such as polymer, glass, crystalline material such as sapphire, etc. This allows a user such as viewer 28 who is viewing display 14 in direction 26 to view an image on display 14.

As shown in FIG. 1, the display cover structures may include an outer display cover layer portion such as outer display cover layer 44, a central inner display cover layer portion such as inner display cover layer 42, and image transport border structure 16. Display cover layers 44 and layer 42 may be formed from clear material such as a layer (plate) of clear polymer, glass, crystalline material such as sapphire, etc. Layers 44 and 42 may be separate layers that are attached to each other (e.g., using adhesive 46 formed from polymer such as a thin layer of optically clear adhesive) or layer 42 may be formed as an integral portion of layer 44.

Border structure 16 may be formed from image transport material and may extend in a strip around the periphery of layer 42. For example, in configurations in which layer 42 has a rectangular footprint (outline when viewed from above in direction 26), border structure 16 may have a rectangular ring shape that surrounds layer 42. Border structure 16 may have input and output surfaces of any suitable shape. As shown in FIG. 1, for example, the input surface of border structure 16 may be planar and may rest against a planar peripheral edge portion of display 14 to receive an image from that portion of display 14. The output surface of border structure 16 at which that peripheral edge portion of the image is presented may have a curved cross-sectional profile.

During operation, pixels P of display 14 produce an image. Light from the image passes through layer 42 and layer 44. The central portion of the image on display 14 is visible to viewer 28 through layers 42 and 44. In border structure 16, the portion of the image on display 14 that is overlapped by border structure 16 passes from the input surface on the inwardly facing side of border structure 16 to the corresponding output surface on the outwardly facing side of border structure 16 and subsequently passes through the overlapping portion of layer 44.

Because border structure 16 is formed from image transfer material, the portion of the display image on the input surface of border structure 16 is passed to the output surface of border structure 16 through the fibers, elongated filaments, or other optical structures of the border structure. The outer surface of border structure 16 may be uncovered by any portions of display cover layer 44 or, as shown in the illustrative configuration of FIG. 1, a peripheral portion of display cover layer 44 may cover and protect the outer surface of border structure 16. The image presented on the outwardly facing surface of border structure 16 may be viewed through the transparent material forming overlapping portions of display cover layer 44.

Border structure 16 may have parallel planar input and output surfaces or, as shown in the illustrative configuration of FIG. 1, border structure 16 may have other suitable shapes (e.g., shapes where the input and/or output surfaces are curved and/or planar, where the input and/or output surfaces are parallel and/or are not parallel to each other, etc.). Border structure 16 may have optical structures that are straight, that have a single bend, that have two bends, and/or that have more than two bends.

During operation of display 14, image light from display 14 passes through layers 42 and 44 and through structure 16 for viewing by a user such as viewer 28 who is viewing device 10 in direction 26 (e.g., a user who is viewing device 10 straight on in a direction parallel to the surface normal of a planar central portion of layer 16 on front face F, a user who is viewing device 10 at an off-axis viewing angle such as at a 45° angle to the surface normal of a planar central portion of layer 16, or a user who is viewing device 10 in other directions).

Border structure 16 may be formed from image transport layer material such as a coherent fiber bundle or other elongated optical features. In configurations in which structure 16 is a coherent fiber bundle, elongated structures 16F may be optical fibers. In configurations in which structure 16 is formed from Anderson localization material structures 16F may be a group of filaments that have different refractive index values. Anderson localization material is characterized by transversely random refractive index features (e.g., higher index regions and lower index regions or regions of three or more or four or more different respective refractive indices) with a lateral size of about 300-500 nm, at least 100 nm, at least 700 nm, at least 1 micron, less than 5 microns, less than 1.5 microns, less than two wavelengths, or other suitable lateral size that are configured to exhibit two-dimensional transverse Anderson localization of light (e.g., the light output from the display of device 10). These refractive index variations are longitudinally invariant along the direction of light propagation and are generally perpendicular to the surface normal of a layer of Anderson localization material (e.g., the refractive index variations have filamentary shapes that run from the lower input surface of structure 16 of FIG. 1 to the upper output surface of structure 16 of FIG. 1) as illustrated by structures 16F. In some configurations, elongated optical structures in border structure 16 (e.g., the fibers in a coherent fiber bundle or the filaments in an Anderson localization material) may have one or more bends and/or other distortions, as shown by structures 16F of FIG. 1.

Image transport material such as Anderson localization material and coherent fiber bundle material can be used to form strips that run along the periphery of display 14 (e.g., border structure 16). Border structure 16 may be formed from a layer of image transport material with a thickness of at least 0.2 mm, at least 0.5 m, at least 1 mm, at least 2 mm, at least 5 mm, less than 20 mm, less than 10 mm, or other suitable thickness. Anderson localization material and coherent fiber bundle material may also be used to form other image transport structures in device 10 (e.g., straight and/or bent elongated light pipes, spherical shapes, cones, tapered shapes, etc.). As shown in FIG. 1, the surfaces of image transport layer structures such as structure 16 may be planar and/or may have curved cross-sectional profiles (e.g., the edges of device 10 may have rounded outer surfaces). These surfaces may be formed by performing operations such as molding operations, slicing operations, grinding operations, and polishing operations on blocks of image transport layer material.

Figure 2:
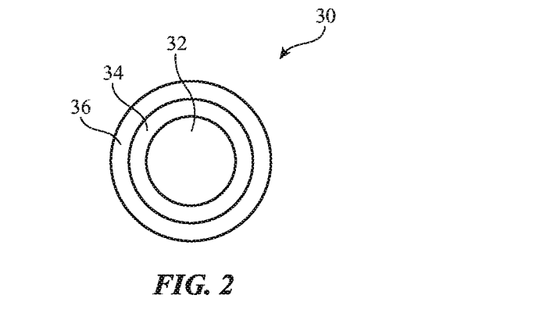
FIG. 2 is a cross-sectional view of an illustrative optical fiber in accordance with an embodiment.

In coherent fiber bundles, a set of fibers are fused together to form layer 16. An illustrative fiber is shown in FIG. 2. As shown in FIG. 2, fiber 30 may have a transparent core 32 and one or more layers such as layer 36 (e.g., a lower-index cladding) and layer 34 (e.g., a clear binder material, a stray light absorption layer, and/or other layers).

Figure 3:
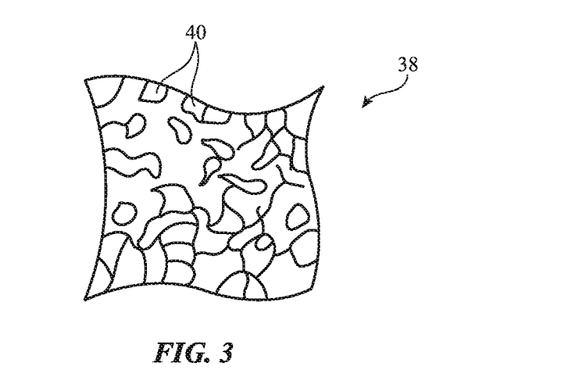
FIG. 3 is a cross-sectional view of illustrative Anderson localization material in accordance with an embodiment.
Figure 4:
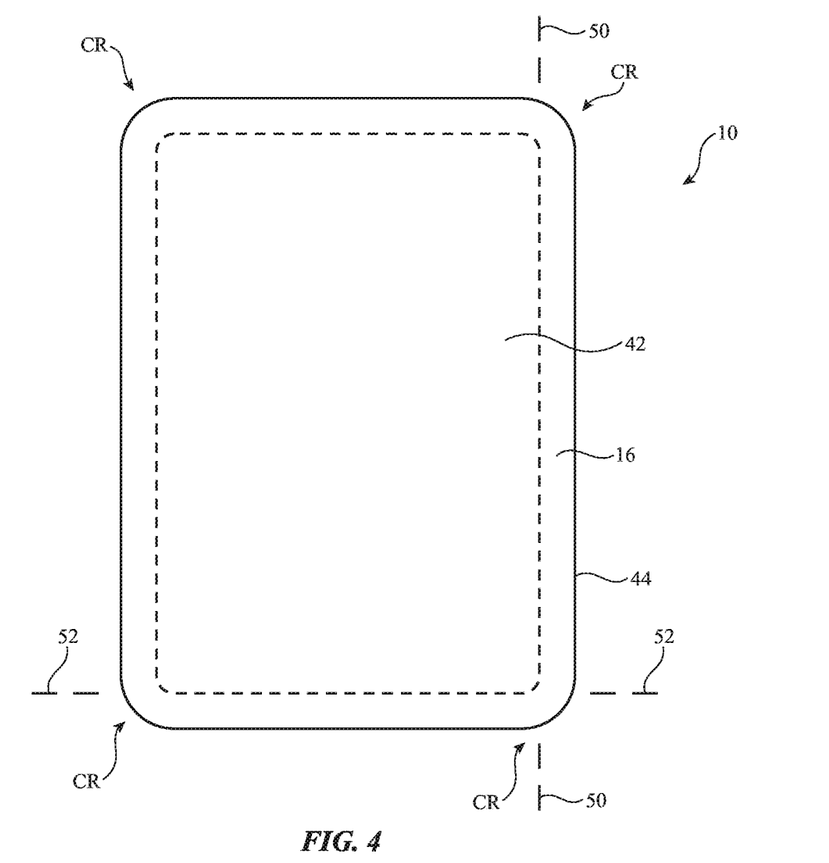
FIG. 4 is a top view of an illustrative rectangular electronic device having a border formed from image transfer layer material in accordance with an embodiment.

Illustrative Anderson localization material for forming layer 16 is shown in FIG. 3. As shown in FIG. 4, Anderson localization material 38 contains a random (pseudorandom) set of elongated optical structures 40 (e.g., filaments with different refractive index values). The filaments are distributed laterally with a random (pseudorandom) pattern. Material 38 may contain elongated optical structures (e.g., filaments) with 2-4, at least 2, at least 3, at least 4, fewer than 6, fewer than 5, or other suitable number of different materials of different respective refractive index values.

FIG. 4 is a top view of device 10 in an illustrative configuration in which device 10, housing 12, and the display of device 10 each have a rectangular outline with four edges and rounded corners. Other suitable shapes may be used for device 10, if desired. In the example of FIG. 4, each of the four edges of device 10 may have a curved cross-sectional profile of the type shown in FIG. 1. For example, the outermost surface of display cover layer 44 along the lower edge of device 10 of FIG. 4 may be bent downwards around bend axis 52. The outermost surface of display cover layer 44 along the opposing upper edge of device 10 may be curved around a parallel bend axis. The left and right edges of display cover layer 44 may also be bent downwards so that the outermost surface of display cover layer 44 has a curved cross-sectional shape. For example, the portion of display cover layer 44 along the right edge of device 10 may be bent downwards around bent axis 50. In corners CR of device 10, the outermost surface of display cover layer 44 may exhibit compound curvature (e.g., these corner portions may curve downwards smoothly to join adjacent curved edges). As shown in FIG. 4, layer 42 may have a rectangular shape in the center of device 10. Border structure 16 may have a rectangular ring shape that runs along the outer peripheral edge of layer 42. Layer 44 may overlap both layer 42 and border structure 16. The presence of border structure 16 may help expand the visible edge of display 14 and/or may be used to transfer image content to the sidewalls of device 10 from peripheral portions of display 14.

Figure 5:
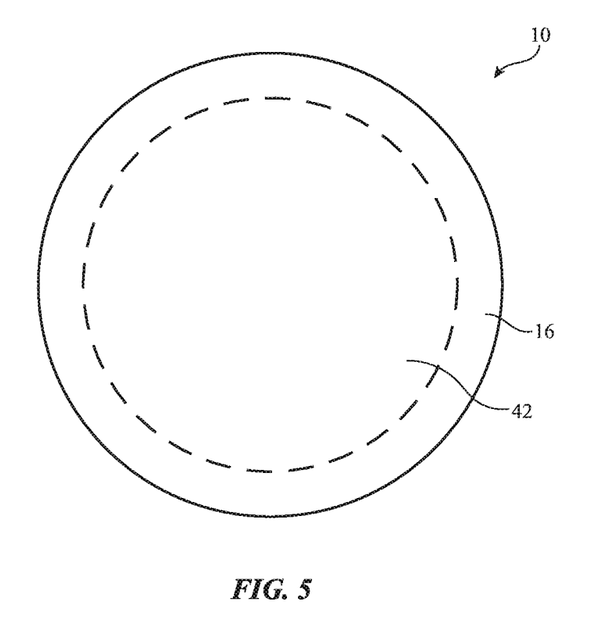
FIG. 5 is a top view of an illustrative circular electronic device having a border formed from image transfer layer material in accordance with an embodiment.

In the example of FIG. 5, device 10 has a circular outline. Layer 42 has a circular outline and lies in the center of device 10. Border structure 16 runs in a circular ring around the periphery of layer 42. Layer 44 overlaps layer 42 and border structure 16. Because border structure 16 surrounds layer 42, border structure 16 can help reduce or eliminated inactive border regions so that display 14 appears borderless or nearly borderless.

Figure 6:
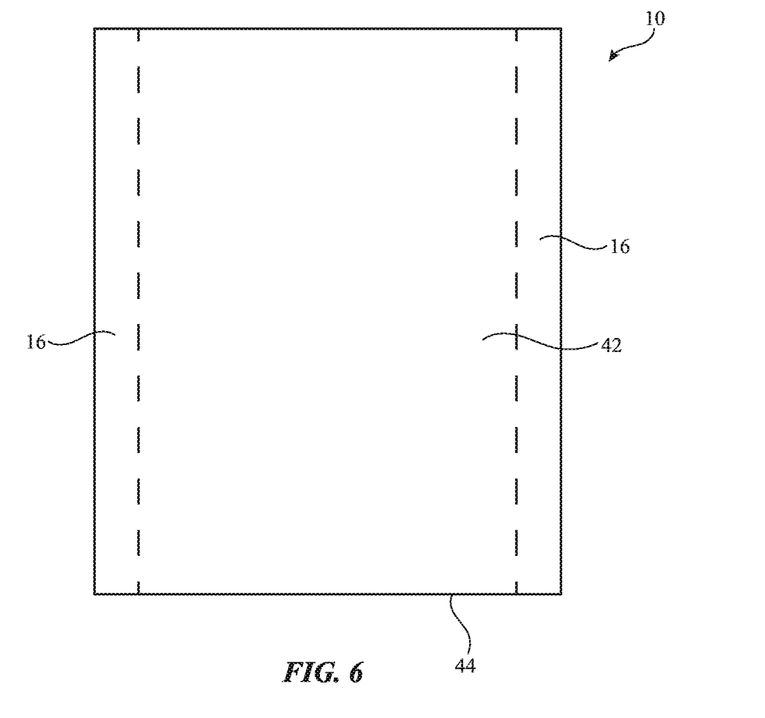
FIG. 6 is a top view of an illustrative electronic device with first and second opposing peripheral edges that include image transfer material in accordance with an embodiment.

If desired, border structure 16 may extend along only part of the periphery of layer 42. This type of arrangement is shown in FIG. 6. As shown in the illustrative configuration of FIG. 6, border structure 16 may extend along the left edge of layer 42 and along the opposing (parallel) right edge of layer 42 but need not (in this example) extend along any of the upper or lower peripheral edge portions of layer 42. Layer 44 may cover layer 42 and border structure 16.

Figure 7:
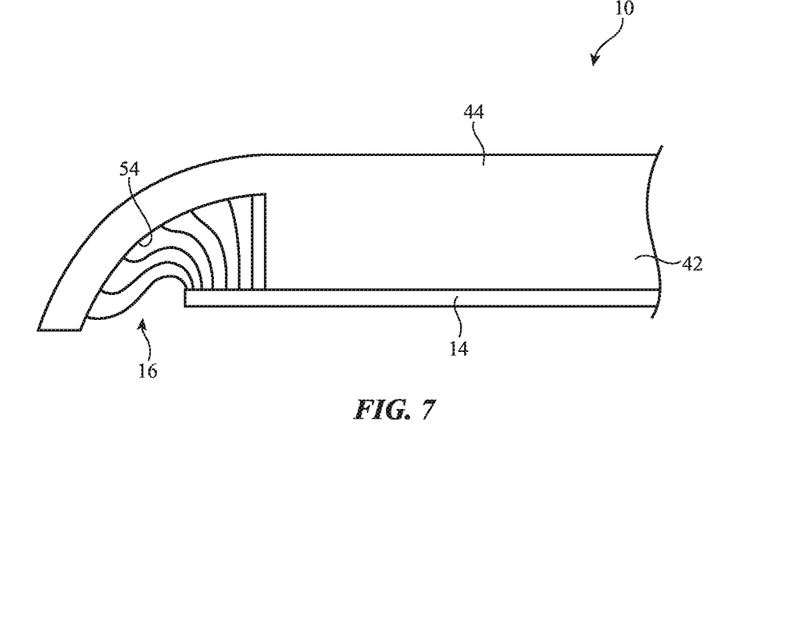
FIGS. 7, 8, 9, and 10 are cross-sectional side views of illustrative electronic devices having a border structure formed from image transport material in accordance with embodiments.

FIG. 7 shows how layer 42 may be formed as an integral portion of layer 44 in the center of device 10. The outwardly facing surface of border structure 16 may rest against curved inner surface 54 of the bent edge portion of display cover layer 52.

Figure 8:
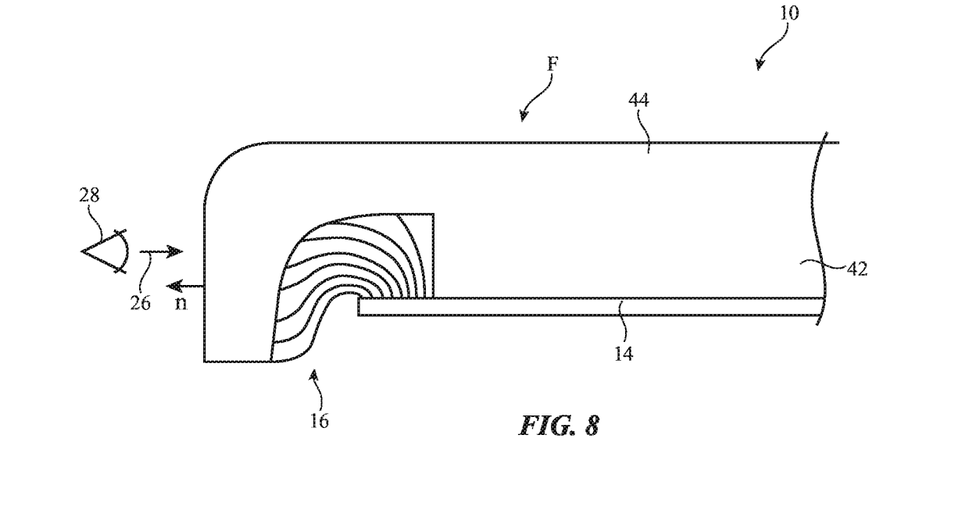

In the illustrative configuration of FIG. 8, the sidewall portion of the outer surface of display cover layer 44 is planar or nearly planar and extends vertically (in the orientation of FIG. 8). Surface normal n of the sidewall surface faces a user such as viewer 28 who is viewing device 10 from the side in direction 26. A touch sensor and/or force sensor may be incorporated into display 14. For example, display 14 may include a two-dimensional capacitive touch sensor and/or may include a force sensor configured to detect touch events (and, if desired, force) associated with contact between the tips of a user's fingers or other external objects and the surface of display cover layer 42. Virtual buttons and other selectable items may be displayed on the sidewall surface of device 10 formed by display cover layer 42 and/or on front face F of display cover layer 42. Border structure 16 may be configured to direct a peripheral portion of the image on display 14 to the sidewall of device 10 in this type of arrangement (e.g., to serve as virtual sidewall buttons). Structure 16 may optionally direct some of the image light from display 14 to front face F.

Figure 9:
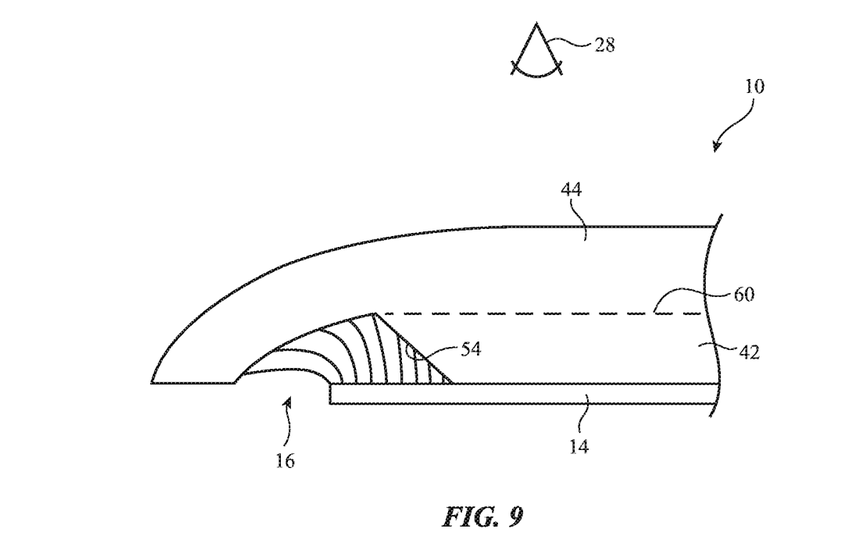

The image transport layer material in structure 16 transports a portion of the image on display 14 to an output surface that, in some configurations, will appear to be closer to the viewer than the image on the portion of the display overlapped by layer 42. To create a smooth transition between the portion of the image on display 14 that is overlapped by layer 42 and layer 44 and the portion of the image on display 14 that is overlapped by border structure 16, inner surface 54 may have a taper, as shown in FIG. 9. As shown in FIG. 9, display cover layer 42 may be an integral portion of display cover layer 44. If desired, display cover layer 42 and layer 44 may be separate layers joined along interface 60 (e.g., using adhesive). Portion 42 overlaps the center of display 14 so that this portion of display 14 will appear optically more distant from viewer 28 than portions of display 14 that are overlapped by border structure 16. Due to the gradual transition provided by tapered inner surface 54, the image on the outer surface of border structure 16 gradually transitions in height so that at the border (transition) between border structure 16 and the portion of display 14 that is not overlapped by border structure 16 the image will not exhibit undesired height discontinuities.

Figure 10:
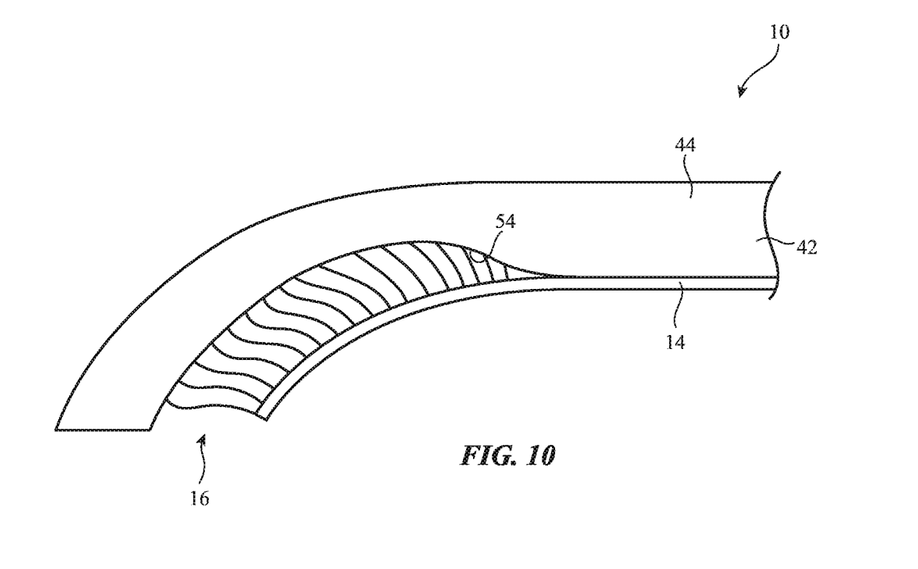

In the illustrative configuration of FIG. 10, display cover layer 42 has been formed as an integral portion of display cover layer 44. Layers 42 and 44 may be separate layers (e.g., layers joined by adhesive), if desired. The shape of curved inner surface 54 is arranged to provide a smooth transition in image viewing distance between the portion of display 14 that is overlapped by layer 42 and the portion of display 14 that is overlapped by border structure 16. The peripheral edge portion of display 14 has been bent downward (e.g., to help fit display 14 to the curved inner surface of the curved sidewall portion of display cover layer 44). Border structure 16 has a curved input surface and a corresponding curved output surface. The thickness of border structure 16 tapers between a larger value and a smaller (zero value) at increasing distances from the outermost peripheral edge of device 10 towards the center of display 14, thereby avoiding abrupt discontinuities in the height at which the image on display 14 is presented to the user for viewing.

Figure 11:
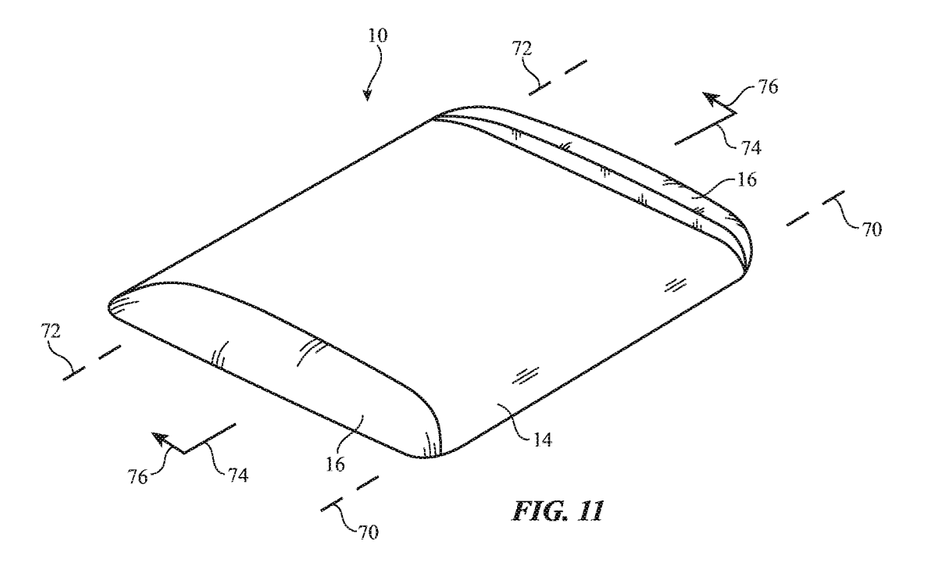
FIG. 11 is a perspective view of a flexible electronic device display that is bent along a first pair of opposing edges and that has two strips of image transport material running along a second pair of opposing edges in accordance with an embodiment.

FIG. 11 is a perspective view of device 10 in an illustrative configuration in which border structure 16 extends along the opposing upper and lower edges of device 10. The outer surface of border structure 16 may exhibit a curved cross-sectional profile. Corners may exhibit compound curvature. The left and right edges of device 10 may be formed by bending a flexible display panel (display 14) downwardly about left bend axis 72 and right bend axis 70, respectively. The upper and lower edges of the pixel array of device 10 may be formed from separate display panels that are overlapped by the respective input surfaces of the upper and lower portions of border structure 16. During operation, image content from the upper and lower portions of the image is presented on the output surfaces of border structure 16 along the upper and lower edges of device 10. Display cover layer 42 may extend between the strip-shaped border structure at the top edge of device 10 and the strip-shaped border structure at the lower edge of device 10 and may extend from the left to right edge of device 10. Display cover layer 44 may overlap border structures 16 and layer 42.

Figure 12:
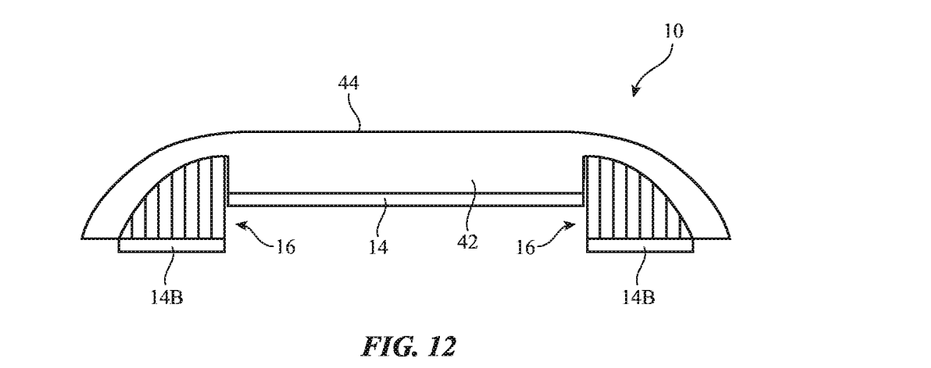
FIG. 12 is a cross-sectional side view of the display and image transport material of FIG. 11 when coved by display cover layer structures in accordance with an embodiment.

FIG. 12 is a cross-sectional side view of device 10 of FIG. 11 taken along line 74 and viewed in direction 76. As shown in FIG. 12, display cover layer 44 may have an integral portion 42 (or a separate attached portion 42) that overlaps display 14 in the center of device 10. Display panels 14B (sometimes referred to as strip-shaped displays, pixel arrays, strips of pixels, or display strips) may be planar panels or other panels that extend along the upper and lower edges of device 10. The pixel arrays of panels 14B may display image content in coordination with the pixel array of the main portion of the display (display 14). In this way, these pixel arrays may form a set of pixels that displays an image for viewing by a user. Displays 14B may be formed from electrophoretic ink pixel arrays, pixel arrays formed from liquid crystal display pixels or light-emitting diode display pixels, or other suitable display pixels. Display 14 (e.g., a flexible display) may be formed from a flexible organic light-emitting diode display or other flexible display (as an example). The strips of image transport layer material in border structure 16 may overlap the pixel array portions formed by displays 14B and may transport an image on displays 14B to an opposing inner surface of display cover layer 44.

If desired, protective layers (e.g., glass layers, thin-film coatings, and/or other layers of material) may be added to the inner and/or outer surfaces of structure 16, layer 42, and/or layer 44 and/or structure 16, layer 42, and/or layer 44 may be coupled to additional layer(s) of glass, polymer, crystalline material such as sapphire, or other material. Structure 16 may include coherent fiber bundle material and/or Anderson localization material formed from glass, crystalline material such as sapphire, polymer and/or other transparent material. If desired, portions of the display cover layer structures (e.g., layer 44) may be omitted. The outer surface of border structure 16 may, if desired, be chemically hardened and/or coated with a protective thin-film layer.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device, comprising:
   first pixels that are configured to display a first portion of an image;
   second pixels that are configured to display a second portion of the image;
   third pixels that are configured to display a third portion of the image that extends between the first and second portions;
   a display cover structure; and
   a border structure of image transport material formed from a coherent fiber bundle having an input surface at which the first and second portions of the image are received and an output surface to which the first and second portions of the image are transported, wherein the border structure runs along an edge of the display cover structure, has a first portion that covers the first pixels, and has a second portion that covers the second pixels, wherein a portion of the display cover structure extends between the first and second portions of the border structure and covers the third pixels, and wherein no image transport material lies between the portion of the display cover structure and the third pixels.

2. The electronic device defined in claim 1 wherein the display cover structure comprises a display cover layer, wherein a first portion of the display cover layer overlaps the first portion of the border structure and wherein a second portion of the display cover layer overlaps the second portion of the border structure.

3. The electronic device defined in claim 1 wherein the portion of the display cover structure comprises a clear layer that overlaps the third pixels and wherein the third portion of the image is viewable through the clear layer.

4. The electronic device defined in claim 1 wherein the first portion of the image comprises a first peripheral edge portion of the image and wherein the second portion of the image comprises an opposing second peripheral edge portion of the image.

5. The electronic device defined in claim 4 wherein the first portion of the border structure comprises a first strip-shaped structure that overlaps the first pixels and wherein the second portion of the border structure comprises a second strip-shaped structure that overlaps the second pixels.

6. The electronic device defined in claim 1 wherein the display cover structure comprises an additional portion that overlaps the border structure.

7. The electronic device defined in claim 6 wherein the third pixels are configured to form a flexible display panel with bent edges.

8. The electronic device defined in claim 7 wherein the first pixels and the second pixels are formed on different display panels than the third pixels.

9. The electronic device defined in claim 8 wherein the first pixels and the second pixels are formed on planar substrates.

10. The electronic device defined in claim 1 wherein the third pixels are configured to form a flexible display panel with bent edges.

11. The electronic device defined in claim 1 further comprising a housing having first and second opposing peripheral edges, a third peripheral edge that extends between the first and second opposing peripheral edges, and an opposing fourth peripheral edge that extends between the first and second opposing peripheral edges, wherein the first pixels extend along the first peripheral edge, the second pixels extend along the second peripheral edge, and the third pixels extend between the third and fourth peripheral edges.

12. An electronic device, comprising:
- a pixel array configured to display an image;
- display cover layer structures, wherein a first portion of the display cover layer structures overlaps a central portion of the pixel array; and
- a border structure of image transport material that has a ring shape running laterally along a periphery of the first portion of the display cover layer structures, wherein the border structure includes elongated structures of image transport material, each elongated structure having first and second opposing ends, the first end of each elongated structure defining an input surface that receives an edge portion of the image from a peripheral portion of the pixel array and the second end of each elongated structure defining a corresponding output surface at which the received edge portion of the image is provided and wherein the display cover layer structures have a second portion that overlaps the first portion of the display cover layer structures and the border structure.

13. The electronic device defined in claim 12 wherein the first portion of the display cover layer structures comprises a first display cover layer and wherein the second portion of the display cover layer structures comprises a second display cover layer that is attached to the first display cover layer.

14. The electronic device defined in claim 12 wherein the first and second portions of the display cover layer structures are parts of a common display cover layer.

15. The electronic device defined in claim 12 wherein the second portion of the display cover layer structures has an inner surface with a curved cross-sectional profile that overlaps the border structure.

16. The electronic device defined in claim 12 wherein the border structure has a circular ring shape.

17. The electronic device defined in claim 12 wherein the border structure has a rectangular ring shape.

18. An electronic device, comprising:
- a pixel array configured to produce an image, wherein the pixel array has a peripheral edge portion;
- a ring-shaped border structure of image transport material formed from elongated structures of image transport material, each elongated structure having first and second opposing sides, the first side of each elongated structure defining an input surface configured to receive a portion of the image produced by the peripheral edge portion of the pixel array and the second side of each elongated structure defining an output surface to which the portion of the image is transported, the output surface having a curved cross-sectional profile; and
- display cover layer structures having a central portion that overlaps a portion of the pixel array that is surrounded by the peripheral edge portion of the pixel array and having an edge portion that overlaps the ring-shaped border structure, wherein the central portion of the display cover layer structures has a periphery that is laterally surrounded by the ring-shaped border structure.

19. The electronic device defined in claim 18 wherein the display cover layer structures comprise an inner surface with a tapered profile that extends from the edge portion of the display cover layer structures to the central portion of the display cover layer structures.

20. The electronic device defined in claim 1 wherein the first and second portions of the border structure laterally surround the portion of the display cover structure on opposing sides of the portion of the display cover structure.

* * * * *